UNITED STATES PATENT OFFICE.

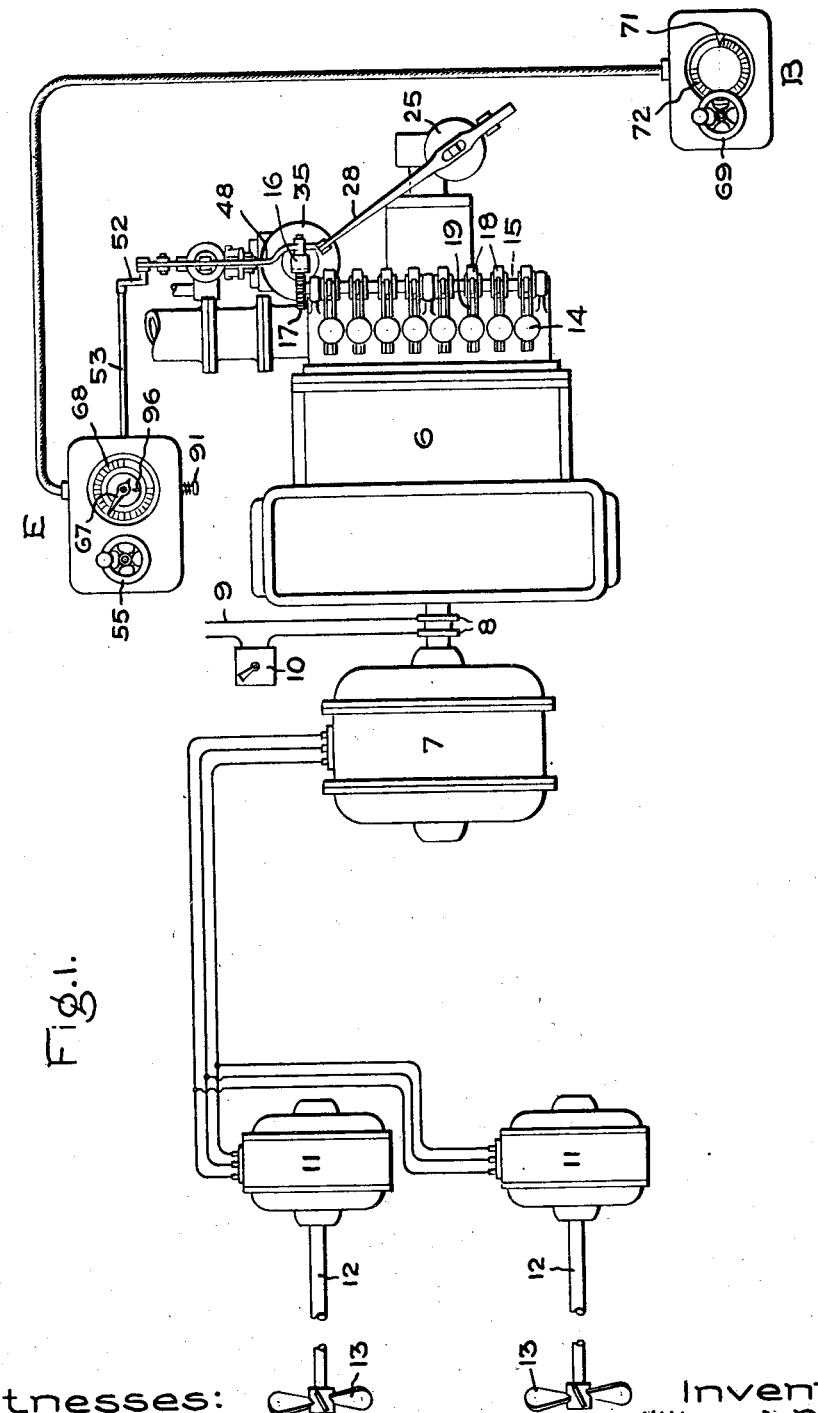

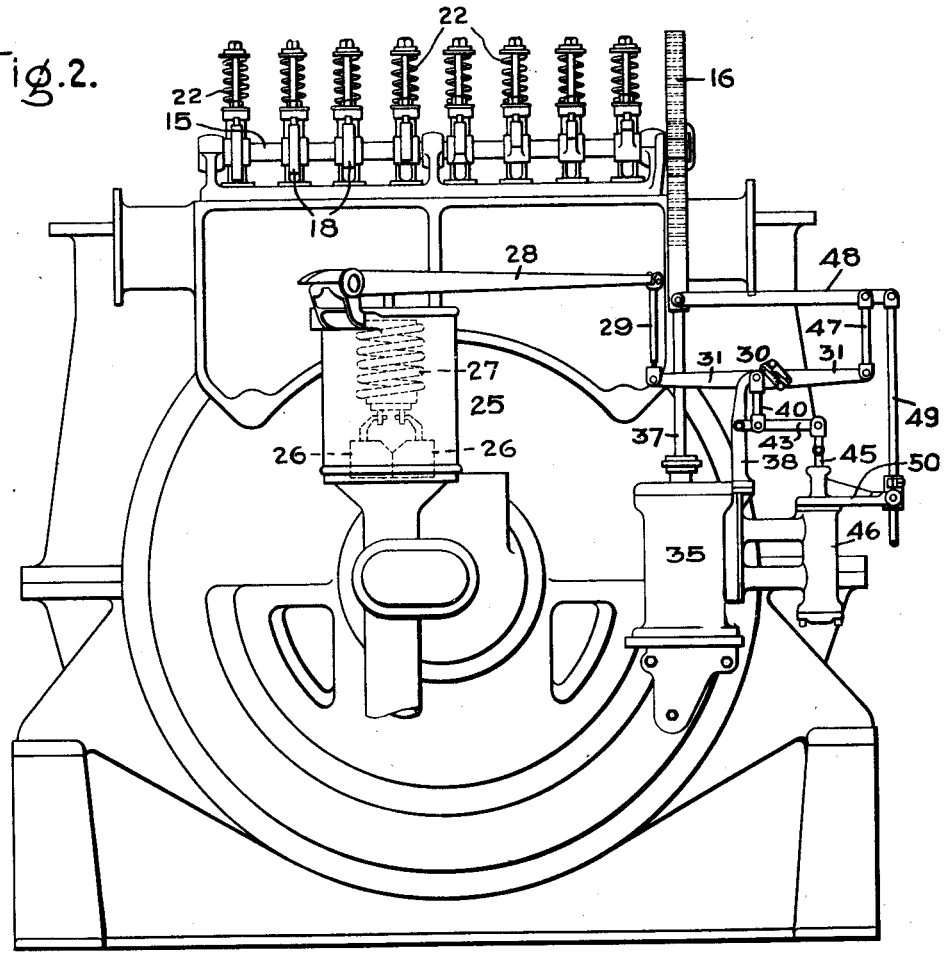
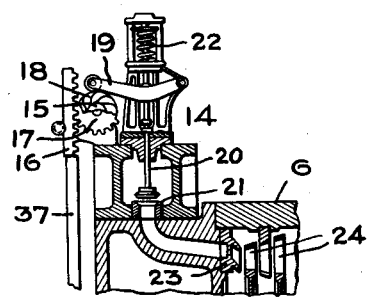

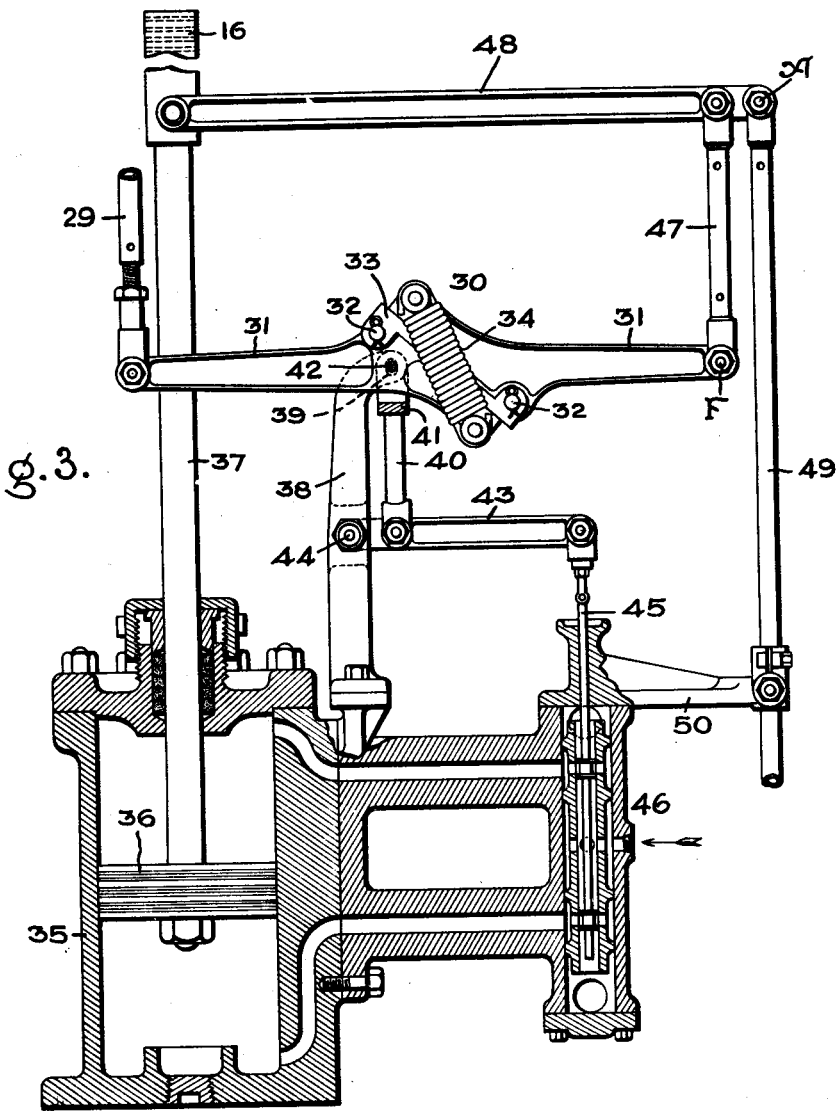

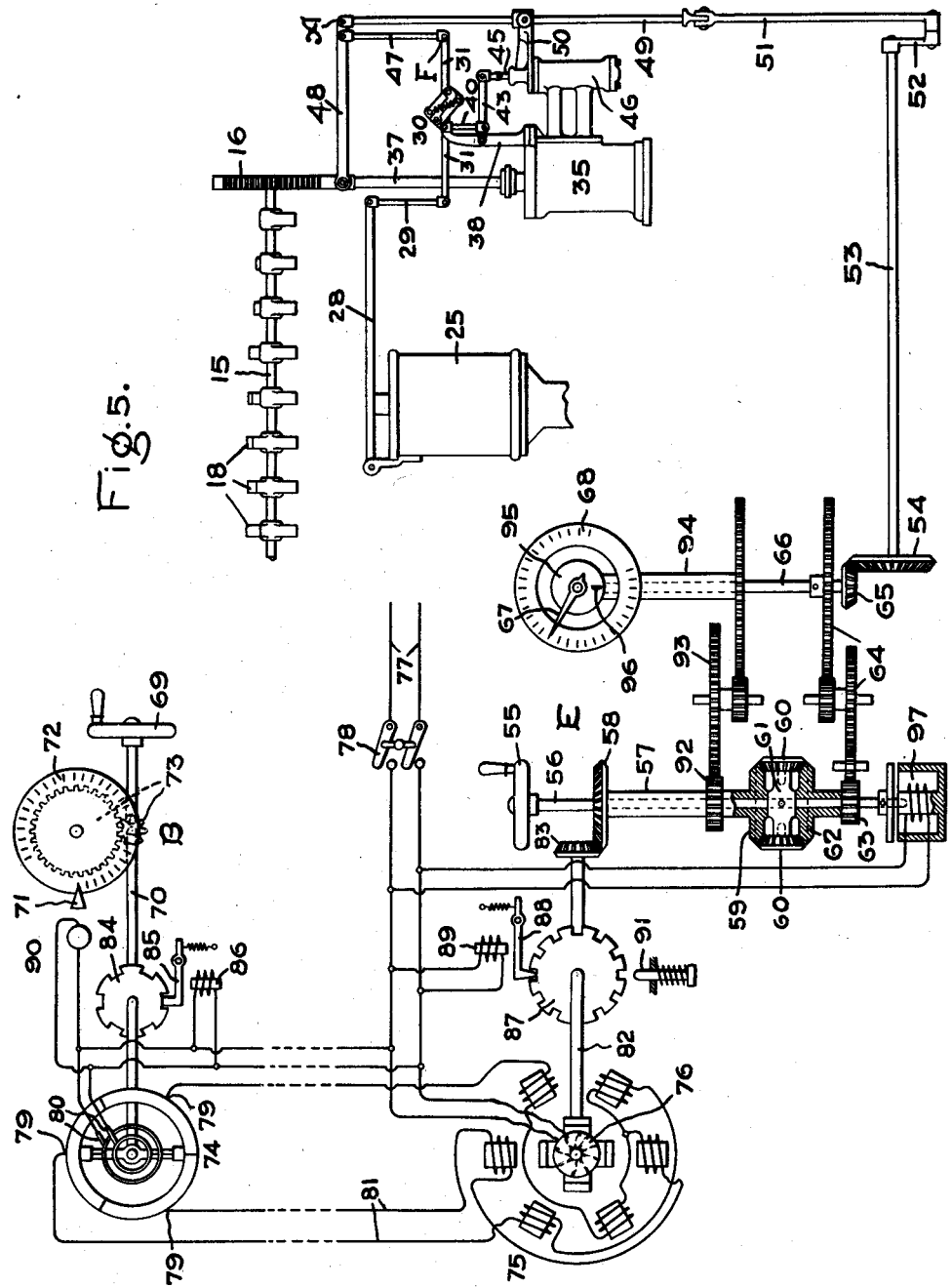

WILLIAM L. R. EMMET, OF SCHENECTADY, NEW YORK, ASSIGNOR TO GENERAL ELECTRIC COMPANY, A CORPORATION OF NEW YORK.

SYSTEM OF SHIP PROPULSION.

1,137,308.  Specification of Letters Patent.  Patented Apr. 27, 1915.

Application filed September 17, 1912. Serial No. 720,764.

*To all whom it may concern:*

Be it known that I, WILLIAM L. R. EMMET, a citizen of the United States, residing at Schenectady, county of Schenectady, State of New York, have invented certain new and useful Improvements in Systems of Ship Propulsion, of which the following is a specification.

My invention relates to systems of ship propulsion in which the propeller shafts are rotated by electric motors receiving current from generators driven by elastic fluid turbines.

The objects of my invention are to provide in a ship propulsion system of the type above described a novel combination and arrangement of apparatus for obtaining a more satisfactory and efficient speed control than has heretofore been possible in a system of this character.

In propelling ships, particularly those of larger size, by electric motors, it is desirable to use alternating currents since the motors and the generators for alternating currents are simpler than those for direct currents, the generator can be conveniently designed, for larger capacities and higher speeds, and therefore are better adapted for use with steam-turbines. Alternating current motors of the simplest type require no commutators and can be constructed and wound in such a manner that they will stand the roughest usage with a minimum of trouble and expense for maintenance. Such alternating current motors, however, are best adapted to operation at speeds synchronous or nearly synchronous with the speed of the generator, and therefore where such motors are used it is desirable to change the speed of the vessel by changing the speed of the generator. When a steam turbine is used as the prime mover of such a system, the speed of the generator and motors can be varied by simply changing the steam admission to the turbine, the resistance of the propeller balancing the force of the steam and the electrical apparatus establishing a fixed ratio between the turbine speed and that of the propeller. Such method of control would be adequate for handling a vessel, were it not for the fact that it is desirable to interrupt the electric circuit for purposes of changing connections for reversing or for changing the arrangements of windings to give different ratios of speed reduction.

In the event of such interruptions the load is removed from the prime mover and it will immediately acquire an excessive speed unless a means is provided for limiting it. In the plans devised previous to my present invention, such speed increase of the generator has been limited either by an emergency trip which served to shut off the steam entirely when some predetermined speed limit of the generator had been reached, or by a governor which came into play at speeds of the generating unit above those normally used for propelling the ship and which served to automatically throttle the steam at these excess speeds so that the generator would be kept in motion during such periods of disconnection and be ready for immediate use when the circuit was reëstablished. This latter arrangement, while operative, is subject to certain objections. The rise of speed of the generator to its highest limit during times of idleness is somewhat inconvenient since it involves unnecessary rushes of current and increases of electrical force when the circuit is reëstablished. It also involves some complication and inconvenience in the steam admission devices, since means must be provided by which the governor can control the steam admission and by which it can at the same time be controlled by hand operation without interfering with the function of the governor.

My present invention provides means by which the governor itself automatically maintains any approximate speed which may be desired whether the turbine is connected or disconnected, loaded or unloaded, so that when the circuit is interrupted there is no appreciable rise in the generator speed and the generator remains ready for use under conditions similar to those which existed before the interruption, unless some adjustment has in the meantime been made. This I accomplish by the use of a specially constructed governor similar in principle of action to speed governors ordinarily used in prime movers but different in the respect that it is made adjustable for a wide range of speed variation corresponding to the total range of speed ordinarily required in maneuvering a vessel. In connection with this governor, I provide means of adjustment by which it can be set to maintain any approximate speed, the variation with load for any setting constituting only a very small proportion of the total range of adjustment. The adoption of this arrangement accomplishes two purposes. First, it provides means of maintaining any desired speed whether the generator is loaded or unloaded, and second, it makes available for the ordinary variations of steam admission the same mechanism which is used for the automatic control of admission valves by the governor. Thus by this method the governor does all the work and the operator simply directs its activities. By the means devised for this purpose the mechanical effort necessary to change adjustments of the governor is very small and consequently it is easy to provide means by which these adjustments can be effected from any convenient position and without waste of time or effort.

In carrying out my invention, I provide an adjustable speed governing mechanism comprising a valve for controlling the supply of elastic fluid to the turbine, a valve actuating mechanism and a speed governor. I also provide means for adjusting this governing mechanism to approximately maintain any operating speed, which adjustment can be made at a point near or distant from the turbine or at two independent points, for example in the engine room and on the bridge of the ship. The governing mechanism is adapted to be adjusted to maintain within the usual narrow limits of an ordinary speed governor any speed desired in the navigation of the ship. This adjustment of the governing mechanism is preferably effected by changing the fulcrum of the governor, as will be more fully explained hereinafter.

Additional novel details of construction and combinations of apparatus will be hereinafter described, and the novel features which I believe to be characteristic of my invention will be definitely indicated in the claims appended hereto. The features of construction and mode of operation will be understood by reference to the following description taken in connection with the accompanying drawings which show the preferred embodiment of my invention, and in which:—

Figure 1 is a diagrammatic view of a ship propulsion system, embodying the novel features of my invention; Fig. 2 is an end elevation of the turbine of such a system, showing the speed governing mechanism; Fig. 3 is an enlarged detail view partly in section of the valve motor and some of its controlling levers; Fig. 4 is a partial sectional view of one of the turbine admission valves; and Fig. 5 is a diagrammatic view showing the speed governing mechanism and the apparatus for operating the same from the engine room and from the bridge of the ship.

Referring first to Fig. 1 of the drawings, I have shown an elastic fluid turbine 6 directly coupled to an alternator 7 having slip rings 8 for conducting the exciting current from an external source of direct current 9 to the revolving field of the alternator. A rheostat 10 is inserted in the field circuit for adjusting the exciting current. The alternator is electrically connected to electric motors 11 whose rotor shafts are operatively connected through the propeller shafts 12 to propellers 13.

The speed of the motors 11 is controlled, over the desired range of operating speeds, entirely by regulating the supply of elastic fluid to the turbine 6. For this purpose, the turbine is provided with a suitable controlling valve which is preferably a compound valve comprising a series of admission valves, indicated generally at 14 and whose construction is shown in detail in Fig. 4. This controlling valve may be operated in any desired manner. As shown it is operatively related to a cam shaft 15, which latter is adapted to be rotated by means of the rack 16 and the pinion 17.

The controlling valve and operating mechanism are of a well known form and for the purposes of my present application, it is only necessary to say that the shaft 15 is provided with as many cams 18 as there are valves 14, it being desirable to provide a number of these valves and to have the cams arranged to open them in successive order and to similarly close them. Each valve is operated by a lever 19 having a roller that engages a cam 18. The lever is connected to a valve stem 20, and as the cam moves in the proper direction it raises the valve from its seat 21. The closing of the valve is accomplished by a compression spring 22 which tends to keep the roller in contact with the cam. A nozzle 23 of suitable construction discharges motive fluid against buckets 24 on a rotor wheel that is mounted on the turbine shaft. As previously stated, this shaft is directly connected to the alternating current generator 7.

A governor or other speed-responsive device 25 is operatively connected to the shaft of the turbine. The governor shown in the drawings is of the centrifugal type and comprises the weights 26, the spring 27 and the lever 28, which latter is pivoted at one end to the casing of the governor. A link 29 operatively connects the other end of the lever 28 to one end of a floating lever 30.

The lever 30, as can be clearly seen from Fig. 3, is composed of two similar members 31, 31. These members have inclined faces at one end, which lie adjacent to each other, and the diagonally opposite corners of these ends are pivoted at 32, 32 to a connecting bar 33 arranged adjacent the faces. The other diagonally opposite corners of the members 31 are connected by a spring 34 which tends to hold the parts of the lever operatively engaged. The object of this arrangement is to admit deflection of this floating lever when the governor lever 28 or the actuating rod 49 are moved to an extent which might involve objectionable strain on the mechanism in case the piston 36 is, through lack of actuating fluid pressure or for other cause, not free to follow the movement of the governor or of the actuating rod as intended, or in case the turbine through lack of steam or other cause is not free to change its speed to follow the movements of the actuating rod.

A fluid pressure motor 35 is mounted on the turbine base or casing and is provided with a piston 36 and a piston rod 37, the latter being directly connected to the rack 16. A vertical standard 38 is secured to the casing of the motor 35 and is provided at its upper end with a guide slot 39. A link 40 is provided at one end with a yoke-shaped member 41, having a pin 42, which latter passes through the slot in the upper end of the standard 38 and also through an aperture in one of the members 31 of the floating lever 30. The opposite end of the link 40 is connected to a lever 43 pivoted at 44 on the standard 38. The lever 43 carries at its other end the stem 45 of the pilot valve 46 of the fluid pressure motor 35.

The floating lever 30 is connected to the lower end of a link 47, the upper end of the link being pivoted a short distance from the outer end of an arm 48. The arm 48 is pivoted at one end to the piston rod 37. A reciprocatory actuating rod 49 is pivoted, at the point marked A in Fig. 3 of the drawings, to the opposite end of the arm 48 and extends through a guide 50 secured to the top of the pilot valve casing. A rod 51 connects the lower end of the actuating rod 49 to a crank arm 52 on a rotatable shaft 53. The shaft 53 is provided at one end with a driving gear 54 which is adapted to be operated from either the engine room or the bridge of the ship by a convertible system of control which will now be described.

The gear 54, as above stated, is adapted to be operated from either of two points E or B, Figs. 1 and 5. As shown in the drawings, the point E designates the actuating apparatus in the engine room, and the point B the actuating apparatus on the bridge of the ship. Considering first the actuating apparatus in the engine room, it will be seen by reference to Fig. 5. of the drawings that the gear 54 is adapted to be rotated by a hand wheel 55 secured to the end of a rotatable shaft 56. The shaft 56 is adapted to rotate within a sleeve 57. To the upper end of the sleeve is secured a bevel gear 58 which is adapted to be locked by a mechanism, to be described in detail hereinafter, when the speed governing mechanism is being operated from the engine room. To the other end of the sleeve 57 is secured a member 59 of a planetary gear system. The floating or planetary members 60 of this system are mounted for rotation on the arm 61 which is rigidly secured to the shaft 56. The third member 62 of the planetary gear system is rigidly secured to a sleeve that is mounted for rotation on the shaft 56 which extends some distance beyond the arm 61. A pinion 63 is secured to the same sleeve to which member 62 of the planetary system is fixed, and is adapted to drive through the gear train 64 and bevel gear 65, the driving gear 54 and the rotatable shaft 53.

The bevel gear 65 is secured to a shaft 66 and is adapted to drive, by means of the latter, a pointer 67. This pointer coöperates with a fixed scale or dial 68 to indicate the speed for which the governing mechanism is adjusted.

Upon the bridge of the ship, at the point B indicated in the drawings, is located the second point of control of the governing mechanism for regulating the turbine speed. At this point there is provided a hand wheel 69 for operating a rotatable shaft 70. The amount of rotation of this shaft is indicated by a fixed pointer 71 coöperating with the scale or dial 72, which latter is rotated by the shaft 70 through the coöperation of the gears 73, indicated in dotted lines in Fig. 5. The shaft 70 is adapted to drive a commutating device indicated generally at 74. This commutating device is electrically connected to the stationary member 75 of a synchronous motor. The rotating member 76 of this motor is adapted to be supplied with direct current from a line 77 when the switch 78 is closed.

The particular construction of the synchronous motor and the commutating device forms no part of my present invention, as they are fully described in the patent to Hall No. 706,554, Aug. 12, 1902. Briefly stated, the commutating device consists of a cylinder upon which rests three contact fingers 79 and two supply fingers 80. By this arrangement, the direct current supplied through the fingers 80 is converted into currents having three-phase relation, which currents are conducted through the conductors 81 to the stationary member, or stator, 75 of the synchronous motor. The rotating member, or rotor 76 of this motor is separately excited from the line 77, as previously explained, and is arranged to drive the shaft 82, which in turn drives the sleeve 57 by means of the gears 83 and 58.

A ratchet wheel 84 is rigidly secured to the shaft 70 and normally tends, through the coöperation of a spring-pressed pawl 85, to hold the shaft 70 locked. The pawl 85 is disengaged from the ratchet 84 by means of a relay 86 when the switch 78 is closed, the circuit of the relay being supplied from the line 77. The shaft 82 is provided with a similar locking device comprising the ratchet 87, spring-pressed pawl 88 and relay 89.

An indicating lamp 90 is provided at the point B, and is adapted to have its circuit completed by the closing of the switch 78. The shaft 82 is adapted to be locked manually by means of a pin 91, which is normally held in an inoperative position by means of a spring. When the shaft 82 is locked by the pin 91, the hand wheel 69 may be rotated without operating the speed control mechanism of the turbine, in this manner the indicating devices on the bridge and in the engine room may be placed in synchronism.

A pinion 92 is mounted on the sleeve 57 and through the gear train 93 drives a hollow shaft 94 which is mounted for rotation about the shaft 66. The shaft 94 drives the indicating dial 95, which is provided with a reference mark 96 for a purpose hereinafter explained.

The speed governing mechanism, which comprises the controlling valve for the admission of fluid pressure to the turbine, the hydraulic mechanism for actuating the valve and the centrifugal governor, is adapted to approximately maintain any speed in the range of normal operating speeds of navigation. The governing mechanism therefore directly controls the speed of the turbine. Different speeds are maintained by changing the fulcrum of the governor. The fulcrum of the governor is designated by the letter F in Fig. 3 of the drawings and is the point of connection of the lever 30 and the link 47. Obviously, the point of connection of the link 47 to the arm 48 could also be considered as the governor's fulcrum. The manner of adjusting the fulcrum will be more clearly understood from the following description:

Assuming first that the speed of the turbine is being controlled from the engine room, or point E of the drawings, the operator will manipulate the shaft 53 by means of the hand wheel 55. This is accomplished through the coöperation of the shaft 56, the planetary gear system, the gear train 64 and the bevel gears 65 and 54. The rotation of the shaft 53 produces a vertical movement of the actuating rod 49 by means of the coöperation of the crank arm 52 and the connecting rod 51. The movement of the rod 49 will produce through the link 47, the floating lever 30, the link 40 and the lever 43, a corresponding motion of the valve stem 45. Pressure is thereby admitted to one side of the piston 36 of the fluid pressure motor and causes a movement of the piston rod 37 in an opposite direction to the movement of the rod 49. The movement of the piston rod 37 produces a corresponding movement of the rack 16, and, through the coöperation of the pinion 17 therewith, varies one way or another the admission of elastic fluid through the valves 14 to the turbine.

The movement of the actuating rod 49, say for example upwardly, causes the floating lever 30 to pivot about its point of connection to the link 29. The pin 42 thus moves in the guide slot 39, and in so doing carries the link 40 and operates the pilot valve, as previously mentioned. This admits fluid pressure on the upper side of the piston 36 and causes a downward movement of the piston rod 37. The arm 48 is thereby moved about the point A as a pivot and effects the operation of the follow-up device to bring the pilot valve to its mid-position.

The movement of the rod 49 obviously moves the fulcrum F in the same direction. The movement of the fulcrum F in the follow-up operation is in the opposite direction but the linkages are so proportioned that this latter movement is less than the former, so that there is a resultant movement of the fulcrum F for each movement of the operating rod 49, and in a similar direction. The fulcrum of the governor is thus changed and the speed which it is adjusted to approximately maintain is varied every time the actuating rod 49 is operated. The governor operates the pilot valve in a similar way. A movement of the lever 28 effects, through the link 29, a movement of the floating lever 30 which pivots about the fulcrum F of the governor. The pin 42 is accordingly moved in the guide slot 39 and operates the pilot valve as heretofore described. The slot 39 not only acts as a guide for the pin 42 but also serves as a stop for the stem of the pilot valve, for it will be seen that the ends of the slot limit the movement of the link 40 and hence of the valve stem 45.

The governing mechanism is designed to operate through a wide range of speed from the lowest to the highest operative speed at which it is desired to drive the ship, and is so constructed that it will maintain the speed of the turbine constant, within the usual narrow limits, at any speed for which it is adjusted within this wide range of speed limits. The valve mechanism which is actuated by the speed governor is so arranged that all the valves can be opened or closed by a small fraction of the governor's movement corresponding to only five or ten per cent of its movement, due to the change of speed from the lowest to the highest limits.

The arm 48, pivoted to the piston rod 37, the link 47 and the floating lever 30 constitute a follow-up device for the pilot valve 46. The movement of the piston rod 37 by either the speed governor or the actuating rod 49 will cause a corresponding movement of the link 47. The floating lever pivots about its point of connection to the link 29 and the pin 42 is moved to its normal position midway between the ends of the guide slot 39. The pilot valve 46 is also restored to its mid-position and the piston 36 brought to rest in its new position.

The flexible construction of the floating lever 30 in two parts prevents injuries to the system from movements of the rod 49 or the link 29 when the piston is not free to act or when the turbine, through lack of steam or other cause, is not free to respond, as previously mentioned. When such abnormal movements occur, the adjacent faces of the members 31 of the lever are adapted to separate so that this excessive movement is not objectionably transmitted to other parts of the system. The tension of the spring 34 is such that under normal operating conditions the members 31, 31 act as a rigid one-piece construction.

The pointer 67 is moved about the scale 68 by the operation of the hand wheel 55, and thus will indicate to the operator the speed for which the governing mechanism is set. When the operator at the point E desires to place the control of the turbine in the hands of the operator at the point B, he will close the switch 78. The relays 86 and 89 are thereby energized and will move the pawls 85 and 88 from engagement with the ratchets 84 and 87 respectively. At the same time, the magnetic brake 97 is energized and operates to hold the shaft 56 against rotation so that the operator at the point E can no longer control the speed of the turbine. The indicating lamp 90 will indicate to the operator on the bridge the fact that the speed governing mechanism is under his control.

As previously explained, the bridge operator, by the hand wheel 59, can rotate the shaft 53 by means of the commutating device 74, the synchronous motor, the shaft 82, the sleeve 57, the planetary gear systems, the gear train 64 and the bevel gears 65 and 54. The rotation of the sleeve 57 is communicated through the gear train 93 to the shaft 94 which will move the dial 95, and the position of the mark 96 with reference to its initial or zero position will indicate the magnitude and direction of the movement of the speed governing mechanism by the operator on the bridge.

It will thus be seen that my novel speed governing mechanism is adapted to vary the speed of the turbine by regulating the amount of elastic fluid supply. This regulation of the elastic fluid supply is effected by the fluid pressure motor 35 which is adapted to operate the admission valves 14. The governing mechanism can be controlled from either of two points, one of which may be at a distance from the turbine. Various speeds are obtained by adjusting the governing mechanism, and in this manner any operating speed may be approximately maintained. This adjustment is effected, as previously noted, by changing the fulcrum of the governor. In this manner, the speed which the governing mechanism is adjusted to approximately maintain is the speed at which it is desired to operate the ship, and so if it is desired to lower the speed of the ship, the speed which the governing mechanism is adjusted to approximately maintain is lowered, and, if on the other hand, it is desired to increase the speed of the ship, the speed which the governing mechanism is adjusted to approximately maintain will be increased.

The advantage of such a combination is that in the event of the load being suddenly removed from the system, as for example, by the interruption of the electric circuit of the propeller driving motors, the speed of the turbine will rise only slightly, namely, to the upper speed limit, for which the governing mechanism is adjusted at the time the circuit is interrupted. The turbine, therefore, continues to revolve at such a speed that it is ready to do work whenever the electric circuit is again completed. Furthermore, the speed of the turbine during this no load period is such that as soon as the load is again thrown on the system, the speed of the ship will be brought back to where it was before the load was thrown off. The operator in the engine room, or on the bridge, therefore, not only controls the speed of the turbine and thereby the speed of the ship through the range of normal operating speeds, but he simultaneously adjusts a governing mechanism to maintain the speed of the turbine within the usual narrow limits of a speed governor at any speed within this range. This ability to control the action of the governing mechanism so that any desired speed of the generating unit can be maintained affords many practical advantages. Without such a provision, the generating unit would have to run up to its speed limit every time the electric circuit was interrupted, and when operating at this maximum speed the process of starting the motors and reversing would involve heavier rushes of current and less effective action than where the generator is operated at a relatively low speed at such times.

Another distinct advantage of this system of speed control resides in the fact that the compound valve can be closed and the admission of elastic fluid to the turbine entirely cut off from either the engine room or the bridge of the ship. At very low speeds the governor will fail to act due to the fact that the speed of the turbine shaft is not sufficient to overcome the inertia of the weights 26. Such speeds may be spoken of as below the range for which the governor is designed to operate. At these abnormally low speeds the movement of the actuating rod 49 in the direction for normally producing decreased speed will operate to entirely close the compound admission valve. The supply of steam is thereby entirely cut off from the turbine. Thus there is provided not only a means for regulating the supply of elastic fluid to the turbine, but also means for cutting off entirely such supply.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. A ship propulsion system comprising in combination, an elastic fluid turbine, an alternator coupled to said turbine, a propeller driving motor adapted to be electrically connected to said alternator, and means including an adjustable speed governing mechanism for varying the speed of said motor by adjusting the admission of elastic fluid to said turbine and for approximately maintaining any desired operating speed of the turbine.

2. A ship propulsion system comprising in combination, an elastic fluid turbine, an alternator coupled to said turbine, a propeller driving motor electrically connected to said alternator, an adjustable speed governing mechanism for approximately maintaining any normal operating speed of the turbine, and means located at a distance from the turbine for adjusting said governing mechanism to vary the speed of the ship.

3. A ship propulsion system comprising in combination an elastic fluid turbine, an alternator coupled to said turbine, a propeller driving motor electrically connected to said alternator, an adjustable speed governing mechanism for approximately maintaining any normal operating speed of the turbine, and means located at a plurality of different points for adjusting said governing mechanism to vary the speed of the ship.

4. A ship propulsion system comprising in combination an elastic fluid turbine, an alternator coupled to said turbine, a propeller driving motor electrically connected to said alternator, an adjustable speed governing mechanism for approximately maintaining any normal operating speed of the turbine, means located near the turbine for adjusting said governing mechanism to vary the speed of the ship, and means located at a distance from said turbine for similarly adjusting said governing mechanism.

5. A ship propulsion system comprising in combination an elastic fluid turbine, an alternator coupled to said turbine, a propeller driving motor connected to said alternator, a valve for controlling the admission of elastic fluid to said turbine, means for actuating said valve, an adjustable speed governor adapted to control the operation of said valve actuating means so as to approximately maintain any operating speed of the turbine, and means for adjusting said speed governor to vary the speed of the ship.

6. A ship propulsion system comprising in combination, an elastic fluid turbine, an alternator coupled to said turbine, a propeller driving motor electrically connected to said alternator, an adjustable speed governing mechanism for approximately maintaining any normal operating speed of said turbine, and means for adjusting the governing mechanism to vary the speed of the ship.

7. A ship propulsion system comprising in combination, an elastic fluid turbine, an alternator coupled to said turbine, a propeller driving motor electrically connected to said alternator, a valve for controlling the admission of elastic fluid to said turbine, a fluid pressure motor for operating said valve, an adjustable speed governor in operative relation with said turbine and with said fluid pressure motor, and means for adjusting said governor to vary the speed of the ship.

8. A ship propulsion system comprising in combination, an elastic fluid turbine, an alternator coupled to said turbine, a propeller driving motor electrically connected to said alternator, a valve controlling the admission of elastic fluid to said turbine, means for actuating said valve, a speed governor having an adjustable fulcrum and operatively connected to said valve actuating means, and means for adjusting the fulcrum of said governor over the entire range of operating speeds of the ship.

9. A ship propulsion system comprising in combination, an elastic fluid turbine, an alternator coupled to said turbine, a propeller driving motor electrically connected to said alternator, an adjustable speed governing mechanism for approximately maintaining any normal operating speed of the turbine, and means for adjusting said governing mechanism to vary the speed of the ship and to cut off entirely the admission of elastic fluid to said turbine.

10. A ship propulsion system comprising in combination, an elastic fluid turbine, an alternator coupled to said turbine, a propeller driving motor electrically connected to said alternator, a valve controlling the admission of elastic fluid to said turbine, means for actuating said valve, a speed governor having an adjustable fulcrum and operatively connected to said turbine and to said valve actuating means, and means for adjusting the fulcrum of said governor to vary the speed of the ship and to completely close said valve when the turbine speed is below the range of said governor.

11. A ship propulsion system comprising in combination, an elastic fluid turbine, an alternator coupled to said turbine, a propeller driving motor electrically connected to said alternator, and means including an adjustable speed responsive device for varying the speed of said motor by varying the speed of said turbine and for approximately maintaining any desired operating speed of the turbine.

12. A ship propulsion system comprising in combination, an elastic fluid turbine, an alternator coupled to said turbine, a propeller driving motor electrically connected to said alternator, a valve for controlling the admission of elastic fluid to said turbine, a fluid pressure motor for operating said valve, a pilot valve for controlling the admission of fluid pressure to said motor, a lever operatively connected to said pilot valve, a speed governor in operative relation to said turbine and operatively connected to said lever, and means independent of said governor for actuating said lever to adjust the fulcrum of said speed governor and thereby vary the speed of the ship.

13. A ship propulsion system comprising in combination, an elastic fluid turbine, an alternator coupled to said turbine, a propeller driving motor electrically connected to said alternator, a valve for controlling the admission of elastic fluid to said turbine, a fluid pressure motor having a piston rod operatively connected to said valve, a pilot valve for controlling the operation of said fluid pressure motor, a flexible floating lever operatively connected intermediate its ends to said pilot valve, a speed governor in operative relation to said turbine and operatively connected to one end of said lever, means operatively connecting the other end of said lever to said piston rod and to an actuating rod, and means for operating said actuating rod to adjust the fulcrum of said speed governor and thereby vary the speed of the ship.

In witness whereof, I have hereunto set my hand this 16th day of September, 1912.

WILLIAM L. R. EMMET.

Witnesses:
BENJAMIN B. HULL,
HELEN ORFORD.